US006067003A

United States Patent [19]

Yang

[11] Patent Number: 6,067,003

[45] Date of Patent: May 23, 2000

[54] SURGE ABSORBER WITHOUT CHIPS

[76] Inventor: Bing Lin Yang, 15-2, Haraki 3-chome, Ichikawa-shi, Chiba-ken, 272-0004, Japan

[21] Appl. No.: 09/135,681

[22] Filed: Aug. 18, 1998

[30] Foreign Application Priority Data

| | | | |
|---|---|---|---|
| Mar. 7, 1998 | [JP] | Japan | 10-189486 |
| Apr. 27, 1998 | [JP] | Japan | 10-117612 |

[51] Int. Cl.[7] .................. H01H 39/00; H02H 1/04; H02H 3/20; H02H 3/22

[52] U.S. Cl. .................. 337/28; 337/29; 337/34; 361/120; 361/129

[58] Field of Search .................. 337/28, 29, 30–34; 338/20, 21; 361/111, 112, 117, 120, 129, 130

[56] References Cited

U.S. PATENT DOCUMENTS

| | | | |
|---|---|---|---|
| 4,727,350 | 2/1988 | Ohkubo | 338/21 |
| 4,912,592 | 3/1990 | Findall et al. | 361/120 |
| 5,029,302 | 7/1991 | Masghati et al. | 337/32 |
| 5,663,864 | 9/1997 | Tanaka et al. | 361/120 |
| 5,694,284 | 12/1997 | Oda et al. | 361/119 |
| 5,745,330 | 4/1998 | Yang | 361/120 |

FOREIGN PATENT DOCUMENTS

| | | | |
|---|---|---|---|
| 403077293 A | 4/1991 | Japan | H01T 1/24 |
| 407029667 A | 1/1995 | Japan | H01T 4/12 |
| 7-029667 | 1/1995 | Japan . | |
| 8-273799 | 10/1996 | Japan . | |
| 409266052 A | 10/1997 | Japan | H01T 4/10 |

*Primary Examiner*—Leo P. Picard
*Assistant Examiner*—Anatoly Vortman
*Attorney, Agent, or Firm*—Cantor Colburn LLP

[57] ABSTRACT

There is provided a surge absorber without chips in which a pair of discharge electrodes arranged facing to each other in a housing 1 are fixed by welding of the housing 1 with a distance between the discharge electrodes maintained. Clean and dry air or a mixed gas mainly comprising such air is sealed in an air chamber 4.

9 Claims, 5 Drawing Sheets

SURGE ABSORBER WITHOUT CHIPS

BACKGROUND OF THE INVENTION

1. Field of the Invention

The present invention relates to an electronic device, and in particular, to a surge absorber.

2. Description of the Related Art

Stray waves, noise, and electrostatic disturbances which may cause surges are strong obstacles to the further improvement of the most up-to-date electronic equipment. Especially, high voltage pulse waves cause erroneous operations of semiconductors in electronic equipment. These waves sometimes even damage semiconductors or the devices themselves.

Such problems can, however, be solved by the use of surge absorbers. Conventional surge absorbers produce discharge chips having an insulating microgap or discharge cores, and the discharge chips are sealed in a glass housing. For example, in a MicroAge surge absorber manufactured by Mitsubishi Materials Corporation, after a conductive thin film is grown in the ceramic core and metal cap electrodes are fitted to both edges of the core, a surface of the conductive thin film is removed by laser and a slit, or MicroAge is formed. Discharge chips (discharge cores) formed in such a manner are sealed in a glass tube. By using such a conventional chip type surge absorber, a discharge voltage can be determined based on a width of the MicroAge mentioned above (a thin groove in the form of slit).

Further, there has been a known surge absorber which is composed of conductive films partitioned by microgrooves. However, as it is difficult to optionally select a switching voltage of such a surge absorber, the range of applications of such surge absorbers is extremely restricted. U.S. Pat. No. 4,727,350 discloses a surge absorber which comprises a cylindrical tube core covered with a conductive film having an intersecting micro groove and the exterior of which is sealed in a glass container.

The applicant of the present invention has also proposed a surge absorber in Japanese Patent Laid-Open Publication No. Hie 8-306467 which solves the conventional problems described above. According to the surge absorber, by arranging a tube core between a pair of electrodes sealed in a housing and filling a surrounding air chamber with an inactive gas, surge absorption can be achieved to a higher switching voltage then was possible in the past.

However, each of the surge absorbers mentioned above has a constitution such that discharge chips or discharge cores (tube cores) are produced in order to determine a discharge curve and the discharge chips or the discharge cores are sealed in a housing. Therefore, the constitution becomes complicated and requires a large number of production processes, and production costs cannot be reduced. Especially, when many surge absorbers must be mounted in an electronic device to protect elements or cope with the fluctuation of power-supply voltage, a number of surge absorbers must be used which directly leads to a problem that the equipment cost of the complete device rises.

Further, according to surge absorbers proposed heretofore, a discharge current flows via a tube core, whereby it is difficult to cope with a high switching voltage of ten thousand volts and to completely absorb a surge of large energy at the time of surge absorption. This causes a problem that, due to the residual voltage, a dynamic current (a current which flows into electronic equipment to be protected due to the presence of a residual voltage) arises in a circuit. Further, in the conventional devices, there is a problem that a switching voltage varies depending on specifications of the tube core.

SUMMARY OF THE INVENTION

The present invention is made in consideration of the conventional problems described above and the object is to provide an absorber which can easily be produced in bulk due to its remarkably simple structure and is applicable to a wide range of surge voltage and a surge withstand capacity.

The present invention is directed to providing a surge absorber which is capable of performing surge absorption over a wide range of operating voltages, absorbing instantaneously large energy by remarkably reducing resistance at the time of surge absorption, and eliminating with certainty any residual voltage remaining after conventional surge absorption and any dynamic current which arises resulting from the residual voltage. Further, the surge absorber is an improvement which is capable of fine adjustment of the discharge voltage, discharge speed, and surge withstand capacity (surge current) by allowing optional design of each part of the surge absorber.

In order to achieve the object described above, the present invention is characterized in that a pair of discharge electrodes having lead terminals are arranged face to face at a prescribed distance in a housing, the housing is melted while the prescribed distance is maintained, and both edges of the housing are welded to the electrodes or the lead terminals.

Therefore, according to the present invention, the pair of discharge electrodes are accurately maintained in an arrangement such that they face each other at a prescribed distance in the housing, and, with this arrangement maintained, the electrodes or the lead terminals are sealed by heat welding the housing. Thus, it is possible to optionally select the distance between these two discharge electrodes and facilitate precise adjustment of the distance.

Heretofore, a gas tube arrested manufactured by Ishizuka Electronics Corporation has been known as a typical surge absorber without chips. This conventional device has constitution such that electrodes are arranged facing each other at a prescribed distance maintained by insulating materials, such as glass. However, in the gas tube arrested, a distance between the opposed electrodes is determined according to the length of an insulating tube, and the insulating tube and the electrodes are welded. Such constitution requires the preparation of a great variety of insulating tubes of varied lengths in order to obtain various kinds of opposed electrodes, namely, opposed electrodes separated by varied distances, and it is substantially impossible to obtain a surge absorber without chips which is applicable to a wide range of discharge voltage and a surge withstand capacity. Further, as in insulating tubes made of the glass, since the distance between electrodes is determined according to the length of an insulating tube, the distance between the electrodes fluctuates when the insulating tube and the electrodes are welded by heating. Under the circumstances, heat welding cannot be used, and the insulating tube and the electrodes must be welded at their opposed surfaces. Thus, due to flux or the like which arises at the time of welding, severe contamination occurs in an air chamber, thereby leading to remarkable deterioration of discharge curves.

In contrast with the conventional device described above, the present invention has an advantage that various types of accurate distances between electrodes can be easily obtained because the housing is welded by heating under the condition that a distance between a pair of opposed electrodes is accurately maintained independent of the housing.

Further, the present invention is characterized in that it has a housing, a pair of discharge electrodes which are arranged facing to each other in the housing and connected to leads or terminals, respectively, and an air chamber formed between the pair of discharge electrodes, and in that clean and dry air, a mixed gas of the clean and dry air with an inactive gas, or a mixed gas of the clean and dry air with an nitrogen gas is sealed in the chamber.

Therefore, according to the present invention, utilizing a prescribed air gap, the pair of discharge electrodes are sealed in the housing, and clean and dry air, or a mixed gas of the clean and dry air with an inactive gas or a nitrogen gas is sealed in the air chamber. Thus, with a remarkably simple structure, it is possible to cope with surges of a wide range of switching voltage. Further, since gas resistance in the air chamber is very low at the time of insulation discharge, the operating resistance when dielectric breakdown of gas arises resulting from a surge voltage is very low. Thus, a surge of high switching voltage can be instantaneously absorbed, and residual voltage which has arisen heretofore can be effectively prevented. A surge absorber in which an air gap is merely provided between electrodes is well known as the gas tube arrested described above. However, according to the present invention, by sealing sufficiently clean and dry air in the air chamber and performing in a stable manner a dielectric breakdown of the inside the air chamber arranged between the opposed electrodes, it is possible to securely provide a very useful surge absorption path.

A further aspect of the present invention is characterized in that clean and dry air with humidity of five percent or less and cleanliness of 99.99 percent (0.5 $\mu$mop), which is higher than cleanliness to be obtained through filtration of normal air, is sealed in an air chamber.

In yet another aspect of the present invention, at least one of the pair of discharge electrodes forms a flat discharge surface which is in contact with an air gap.

The surge absorber without chips according to the present invention may be a container made airtight with glass or plastic.

Air to be sealed in the air chamber according to the present invention is not normal air, but clean and dry air, as described above. Its cleanliness is 99.99 percent (0.5 $\mu$mop) which is higher than cleanliness to be obtained through filtration of normal air. With regard to dryness, humidity is five percent or less, preferably three percent or less. Further, as the occasion demands, for example, when required to adjust a surge switching voltage, air to be sealed in the air chamber can be mixed with other inactive gas or the like. It is preferable to use argon or neon as a mixed inactive gas. It is also preferable to use nitrogen instead of such a mixed inactive gas.

The surge absorber without chips described above can be widely used in very complicated electronic circuits which are important components for resetting a high speed computer having a mass storage memory. Therefore, it is possible to effectively exclude the influence of surge waves resulting from frequent ON/OFF operations of a computer display or other electronic equipment.

Further, the surge absorber without chips according to the present invention can also be used in devices to be connected to telephone lines, such as a telephone set, a radio, a facsimile, a modem, and a program controlled telephone exchanger; devices to be connected to antennas or signal conductors, such as an amplifier, a tape recorder, a vehicle radio, a radio transceiver, and a sensor signal conductor; devices required for electrostatic prevention, such as a display and a monitor; domestic appliances; and computer controlled electronic equipment. The surge absorber without chips also functions as an over voltage prevention device. In other words, it is an electronic device effective for counteracting the hazardous influence of static electricity.

Legend
1 and 32: Housing
2 and 28: Discharge electrode
3 and 20: Lead or terminal
4 and 30: Air chamber
6: convexity

DESCRIPTION OF THE PREFERRED EMBODIMENTS

Figure 1:
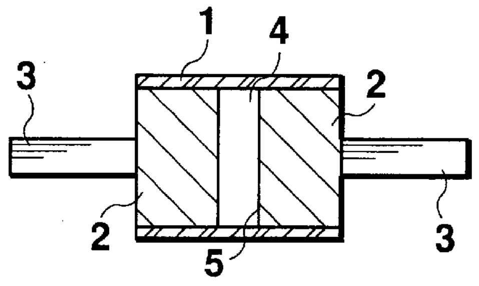
FIG. 1 is a block diagram showing the fundamental constitution of a surge absorber according to the present invention.

FIG. 1 shows a preferred embodiment of a surge absorber without chips according to the present invention. The surge absorber without chips is composed of a housing 1 (usually a glass container), discharge electrodes 2 (for example, Duet electrodes), two leads 3 or leafless terminals 3 to be connected to the discharge electrodes 2, respectively (see FIG. 2), and an air chamber 4 formed between the discharge electrodes.

The present invention relates to a diode capable of efficiently absorbing high voltage floating waves or surge pulses to which a principle that electrical energy is consumed and absorbed by converting the electrical energy into light energy is applied. A reaction characteristic of the absorber is essentially different from the luminous phenomenon of a light emitting diode (LED) or a discharge tube which gradually becomes weak from high luminance to extinction.

As described above, according to the embodiment shown in FIG. 1, in the surge absorber without chips according to the present invention, the air chamber 4 is formed between the discharge electrodes 2 arranged face to face in the housing 1, and when a surge voltage is applied between both the discharge electrodes 2, the surge energy can be absorbed due to dielectric breakdown occurred in the air chamber 4.

As it is clear from FIG. 1, the present invention is characterized in that conventional discharge chips or discharge cores are not used. As described above, in the surge absorber without chips according to the present invention, the pair of discharge electrodes 2 are merely arranged facing to each other in the housing 1. In order to actually realize such constitution, in the present invention, the pair of discharge electrodes 2 are arranged face to face in the housing 1. Normally, one of the pair of discharge electrodes 2 is inserted into a hole provided at a lower jig, and at the same time, the housing 1 is placed into the hole. According to the present invention, in this state of insertion, the outside diameter of the discharge electrodes 2 is selected to be slightly smaller than the inside diameter of the housing 1. Thus, there is no obstacle to insertion of the discharge electrodes 2 into the housing 1, and one of the discharge electrodes 2 and the housing 1 actually stand upright in the lower frame. The other discharge electrode 2 is then inserted into a hole provided at the upper frame. The upper frame is thus positioned and stuck to the lower frame. In such a state, since the other of the discharge electrodes 2 has an outside diameter slightly smaller than the inside diameter of the housing 1, under the condition that the upper and lower frames are closed to each other, the other of the discharge electrodes 2 sustained by the upper frame falls vertically and is positioned being in contact with one of the discharge electrodes 2. The other of the discharge electrodes 2 arranged at the upper frame is then pulled up by a prescribed distance and kept at the position. Any optional mechanism is used for pulling up and maintaining the electrode, but the distance of pulling up the electrode has to be accurately controlled according to the precision required. When the preparation is completed in such a manner, the distance between both the discharge electrodes 2 is accurately adjusted to a prescribed value. Next, the upper and lower frames are placed at a high temperature or the preparatory work for assembly described above is carried out at a high temperature from the beginning. Thus, in both of the upper and lower frames, the discharge electrodes 2 and the housing 1 are heated. Normally, when heated at 600° C., the housing 1 is melted and its both edges are welded and tightly fixed to both the discharge electrodes 2 in FIG. 1. Needless to say, both edges of the housing 1 can be welded, rather to the discharge electrodes 2, to lead terminals as the design demands. Either way, according to the present invention, then heated at a high temperature and then cooled, the upper and lower discharge electrodes 2 are accurately positioned in the jig. The housing 1 is welded with the distance between these electrodes being maintained as described above. It should be understood that, according to the present invention, a very precise distance between the discharge electrodes can be obtained as shown in FIG. 1. Further, according to the present invention, the distance can be adjusted to any distance by optionally changing the distance between the discharge electrodes sustained by the upper and lower frames. Unlike the conventional gas tube arrested, a wide range of surge absorbers without chips can be obtained very easily and accurately.

Further, the present invention is characterized in that a gas to be sealed in the air chamber 4 is clean and dry air or a mixed gas of clean and dry air and an inactive gas or nitrogen.

It is normally preferable that the cleanliness of the air be 99.99 percent (0.5 $\mu$mop), which is higher than cleanliness to be obtained through filtration of normal air, and that for dryness, humidity be kept at five percent or less, with humidity preferably being three percent or less.

In this embodiment, normal air may be filtered by an ATOMS ULTRA ULNA filter manufactured by Nippon Muck Co., Ltd., and that air in which particulate of 0.05 $\mu$m are collected up to 99.9999 percent or more is accumulated and used.

By using such clean and dry air, a dielectric breakdown voltage in the air chamber 4 becomes remarkably stable. More specifically, with regard to dielectric breakdown according to the present invention, if a surge voltage applied between both the discharge electrodes 2 exceeds a prescribed switching voltage, a source of dielectric breakdown will slightly arise at a part of the surface 5 which is in contact with the air chamber 4 in FIG. 1, and the dielectric breakdown will instantaneously extend over the whole air chamber 4. As a result, the clean and dry air will uniformly be subject to the dielectric breakdown in a short time, and a large insulating current can flow between both the discharge electrodes.

As described above, in the surge absorber without chips according to the present invention, the opposed discharge electrodes are arranged in the air chamber 4, and there is no insulators between the discharge electrodes. Therefore, it is possible to eliminate unfavorable conventional phenomena, such as a substantial decrease of the distance between the discharge electrodes resulting from the adhesion of copper molecules generated at the time of discharge to the surface of an insulator, and to provide a stable surge absorber with a long service life.

According to the present invention, such a switching voltage, an insulating current (surge withstand capacity), and an operating speed are determined mainly by volume of the air chamber 4, a gap length between discharge electrodes 2, or a type or pressure of gas sealed. By altering some of these factors, a surge absorber having a wide range of surge switching voltage can be obtained optionally. In the embodiment shown in FIG. 1, a switching voltage can be optionally selected among those of approximately 50 to 13,000 volts according to the factors chosen.

The following table shows some typical examples of the distance between discharge electrodes and the switching voltages according to the present invention.

TABLE 1

| Distance between discharge electrodes (mm) | Discharge voltage (V) |
|---|---|
| 0.04 | 120~450 |
| 0.08 | 250~700 |
| 0.12 | 330~1,000 |
| 0.15 | 500~1,500 |
| 0.2 | 700~2,000 |
| 2.5 | 2,400~5,000 |
| 2.8 | 3,500~7,000 |
| 3.2 | 4,000~12,000 |
| 3.9~4.3 | 8,000~15,000 |

A characteristic effect of the present invention is that, due to the use of clean and dry air, an allowable current density in the air chamber 4 at the time of dielectric breakdown can be remarkably increased. This means that resistance of the clean and dry air is low at the time of dielectric breakdown.

According to the present invention, since dielectric breakdown instantaneously occurs and a large allowable discharge current flows between discharge electrodes 2, even though a large surge voltage arises, the surge energy can be absorbed instantaneously. Thus, it is possible to eliminate with certainty conventional problems, such as occurrence of residual voltage or continuation of a certain dynamic current due to the residual voltage. In the present invention, it is preferable that as a container to form the housing 1, for example, a glass diode container of International Standard DO-34 type with an inside diameter of 0.66 mm is used. Both discharge electrodes 2 are inserted into the edges of the container in a manner suitable for the inside diameter. By using Duet electrodes as these discharge electrodes and carrying out heating under the condition described above, the housing 1 and the discharge electrodes 2 can be perfectly sealed. This sealing work is performed inside a clean and dry air chamber. Consequently, clean and dry air is sealed in the air chamber 4. Of course, another plastic or a shrinkage plastic can also be used for the housing 1 described above.

It is also preferable to use a container of International Standard DO-35 type (inside diameter: 0.76 mm) or DO-41 type (inside diameter: 1.53 mm) as the housing 1. As a surge absorber having a large capacity, a glass diode container with an outside diameter of 3.1 mm can also be used. Further, argon, neon, helium, or nitrogen can be mixed with the clean and dry air to be sealed in the air chamber 4, and, by properly selecting the mixing combination, the surge voltage, surge withstand capacity, or reaction rate can be adjusted optionally.

According to the present invention, as described above, clean and dry air is sealed in the air chamber 4. Thus, when a surge curve is changed by mixing the several gases described above and, for example, a surge voltage is selected from among 50 to 15,000, operating accuracy at each set voltage can be controlled with about a 10-volt margin of error, with only a very fine adjustment being required. By using the clean and dry air, molecules which constitute the air are uniformly distributed in the air chamber 4, and therefore the prescribed volume of the air chamber 4 and the type and pressure of gases sealed lead to stabilization of the surge voltage once set.

Further, according to the present invention, due to the use of clean and dry air, resistance at the time of insulation is very low, whereby an allowable surge current at the time of dielectric breakdown in the air chamber can be large. Thus, even though a large surge voltage arises, the surge energy can be absorbed instantaneously. For example, in Japanese Patent Laid-Open Publication No. Hie 8-306467 described above, if a surge voltage is set to be 6,000 volts, when applying 10,500 volts, a surge current of 1,050 amperes can flow due to the surge absorber. However, even after the surge absorption, a residual voltage of 4,500 volts will remain, whereby a dynamic current of 450 amperes will arise at a circuit. On the other hand, under the same condition, the surge absorber of the present invention can get rid of the residual voltage and dynamic current up to almost zero.

Figure 2:
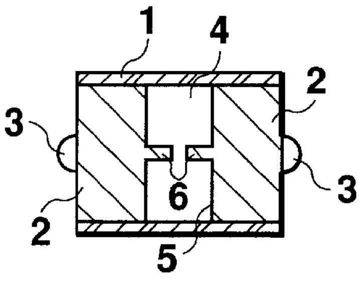
FIG. 2 illustrates another embodiment in which terminals are fitted to the discharge electrodes of the present invention and further convexities are provided on the surfaces of the discharge electrodes.

FIG. 2 illustrates a second embodiment of the present invention. As described above, this embodiment is characterized in that, rather than lead wires, terminals 3 are fitted to the outer edges of the discharge electrodes 2.

Further, according to the second embodiment shown in FIG. 2, respective convexities 6 are provided on the surfaces 5 of both the discharge electrodes 2 which are facing the air chamber 4. Due to the presence of these convexities 6, when a surge voltage is applied, dielectric breakdown in the air chamber 4 is easily induced. Unlike the switching voltage, a surge withstand capacity (current) at the time of dielectric breakdown is not determined by these convexities 6, but almost by the volume of the air chamber 4 (especially, area of discharge electrodes) and the type and pressure of gases sealed.

Figure 3:
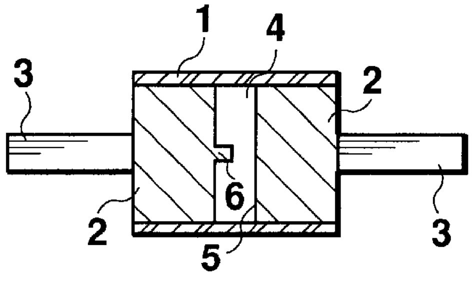
FIG. 3 illustrates yet another embodiment in which a convexity is fitted to one of the discharge electrodes.

FIG. 3 shows an embodiment similar to that of FIG. 2. Detailed description elements of FIG. 3 already described above will not be repeated, but a feature of the embodiment of FIG. 3 is that a convexity 6 is provided on the surface 5 of one of the discharge electrodes 2. According to the present invention, dielectric breakdown in the air chamber 4 is also induced by this unilateral convexity 6, whereby a stable surge voltage can be set.

Further, since the convexity 6 described above induces dielectric breakdown in the air chamber 4, the switching voltage can be determined according to configuration of the convexity 6 or distance between the convexity 6 and the other one of the discharge electrodes 2. A surge withstand capacity at the time of surge absorption is determined according to the volume of the air chamber 4. Unlike the embodiment shown in FIG. 1, according to the embodiment shown in FIG. 2, even though a surge switching voltage is comparatively low, a large surge withstand capacity can be provided.

Figure 4:
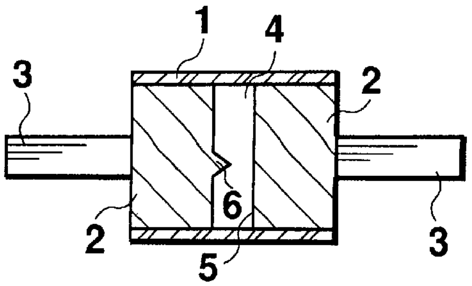
FIG. 4 shows a convexity in the form of circular cone which is fitted to one of the discharge electrodes.

FIG. 4 shows a modification of the embodiment shown in FIG. 3. In FIG. 3, a cylindrical convexity 6 projects from one of the discharge electrodes 2, whereas in FIG. 4, a conical convexity 6 projects.

Figure 5:
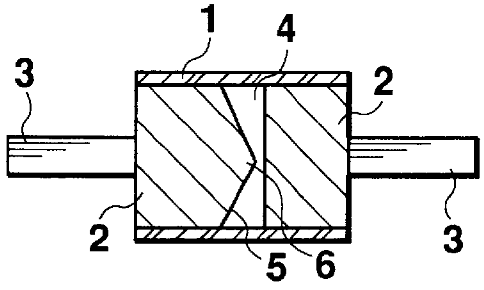
FIG. 5 shows one discharge electrode, the entire body of which is in the form of circular cone.
Figure 6:
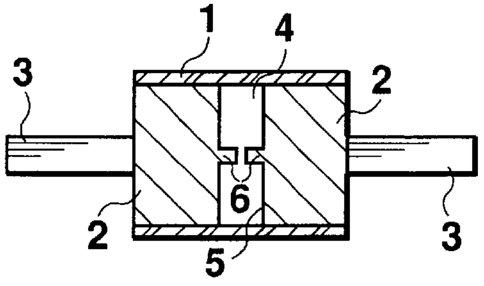
FIG. 6 is a block diagram showing conical convexities which are provided on the surfaces of both discharge electrodes, respectively.
Figure 7:
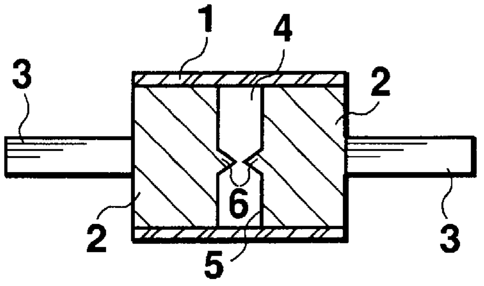
FIG. 7 is a block diagram showing opposed convexities in the form of circular cone which are provided on the surfaces of both discharge electrodes.

FIG. 5 shows a convexity 6 whose configuration differs from those described above. A surface 5 of one of the discharge electrodes 2 in contact with the air chamber 4 has a conical shape. It forms a convexity 6 whose apex is most close to the other one of the electrodes 2. According to this embodiment, as in the case when the apex of the convexity 6 of one of the discharge electrodes 2 is close to the other one of the discharge electrodes 2, the volume of the air chamber can be sufficiently large and the surge withstand capacity can therefore be large, which is an advantage of the present embodiment. Further, unlike the embodiments shown in FIGS. 2, 3, and 4, the embodiment shown in FIG. 5 has a further advantage of facilitating processing of the convexity 6. FIGS. 6 and 7 shows embodiments in which the above-mentioned unilateral convexity shown in FIGS. 3 and 4 is applied to both of the discharge electrodes. As a result as the air chamber 4 is sufficient volume and the opposed gap length of both the convexities 6 is reduced, a low surge switching voltage can be obtained.

Figure 8:
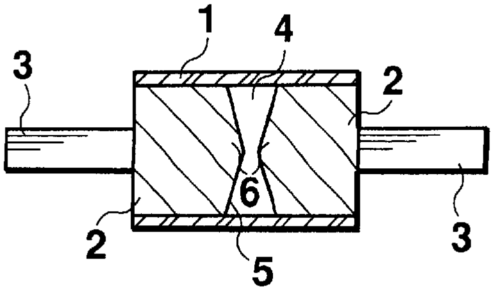
FIG. 8 illustrates an embodiment in which respective entire bodies of both discharge electrodes are in the form of circular cone.

The embodiment shown in FIG. 8 shows a constitution in which the unilateral conic discharge electrode 2 of the embodiment shown in FIG. 5 is arranged on each side of the discharge electrodes 2. According to this embodiment, by putting conic apexes of both the discharge electrodes close to each other, the surge switching voltage can be lowered Also, by increasing the volume of the air chamber 4, the electrostatic capacity of the surge absorber can be reduced and the surge withstand capacity can be increased.

Figure 9:
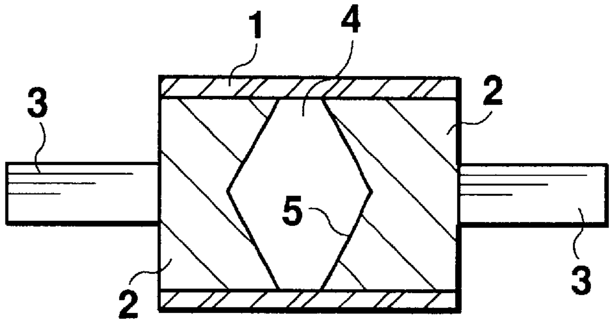
FIG. 9 illustrates an embodiment in which both discharge electrodes have conical convexities.

According to the embodiment shown in FIG. 9, both of the discharge electrodes 2 have a conic convexity. This leads to a result that most of the air chamber 4 is optically shielded from the outside. More specifically, according to the embodiment shown in FIG. 9, with such configuration, it is possible to remove a so-called "occulting effect" in which, due to the influence of light from outside, a surge voltage of the surge absorber fluctuates. Generally speaking, if external light is strong, a surge voltage of the surge absorber will tend to rise. However, according to the embodiment, since little external light enters the air chamber 4, the conventional occulting effect can be remarkably decreased even when external light is strong.

Figure 10:
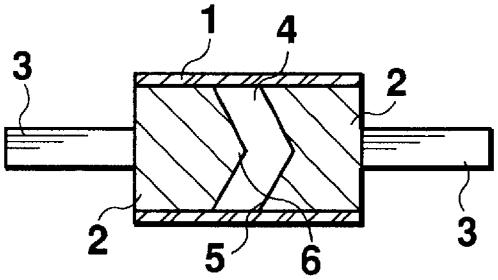
FIG. 10 illustrates an embodiment according to the present invention in which both discharge electrodes have different configurations.

FIG. 10 shows a modification of the embodiment shown in FIG. 5. According to this modification, one of the discharge electrodes 2 has a convex surface, whereas the other has a concave surface. Thus, by selecting either surface of the discharge electrodes, it is possible to optionally select the volume of the air chamber 4 to determine the gap length and surge withstand voltage which induce the discharge.

Figure 11:
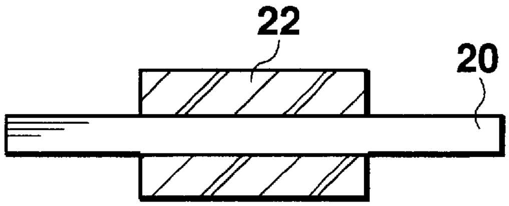
FIG. 11 shows an insulator affixed to the circumference of a lead electrode so as to realize the present invention in a simple manner.
Figure 12:
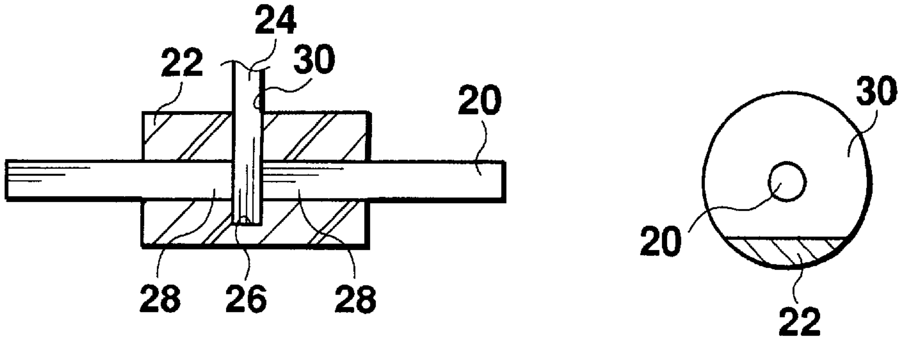
FIG. 12 shows an air chamber formed by making a cut in the insulator shown in FIG. 11 and removing a part of the lead electrode.
Figure 13:
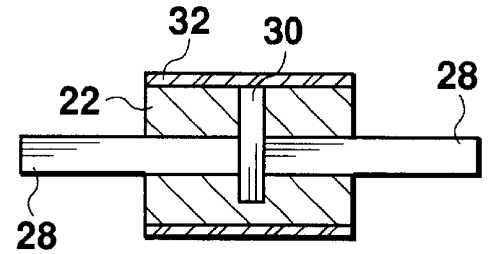
FIG. 13 illustrates an embodiment of another surge absorber according to the present invention in which an insulator having the air chamber obtained in a manner shown in FIG. 12 is sealed.

FIGS. 11, 12, and 13 show another embodiment by which a surge absorber according to the present invention can be easily produced. First, in FIG. 10, an insulator 22 is coated around a lead wire 20 which is a united body of a lead and electrodes. It is preferable that form the insulator 22 be formed of a mixture of plastic and quartz powder. Thus, as shown in FIG. 11, the constitution is such that the insulator 22 is wound and fixed around the lead wire 20. In FIG. 12, a cutter 24 makes a cut 26 at almost the center of the insulator 22 described above. Thus, as shown by the section of FIG. 12, the insulator 22 is cut in such condition that the lead wire 20 is included in a part of the insulator 22, and electrodes 28 are formed at both edges of the lead wire 20, respectively. The cut by the cutter 24 forms an air chamber 30. As shown in FIG. 13, the air chamber can be completely sealed by using shrinkage plastic. Here, by performing the sealing work in a clean and dry air environment, the clean and dry air, which is a feature of the present invention, is sealed in the air chamber 30. Thus, surge absorber without chips can be obtained easily through a very simple production process.

In the surge absorber without chips shown in FIG. 13, the diameter of the lead wire 20 is 0.8 mm and an outside diameter of the insulator 22 is 4.5 mm.

In FIG. 13 described above, shrinkage plastic is used for sealing the air chamber 30. However, in the present invention, it is also possible to achieve sealing by forcing the insulator 22 into an engineering plastic tube.

Figure 14:
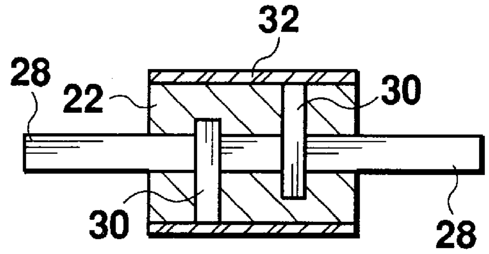
FIG. 14 shows a modification of the embodiment shown in FIG. 13 in which a plurality of air chambers are provided.

FIG. 14 shows a modification which slightly differs from the embodiment shown in FIG. 13. In this embodiment, two air chambers 30, namely, the cuts to be made in the insulator 22, are provided, and the cuts are set to be perpendicular to the axis of the insulator.

In this way, the strength of the insulator 22 can be increased, and a high surge switching voltage can be selected by providing two air chambers 30.

Obviously, the number of air chambers 30 can also be set to any number greater than two making it possible to obtain surge absorber which efficiently operate up to high surge voltages of tens of thousands of volts.

Figure 15:
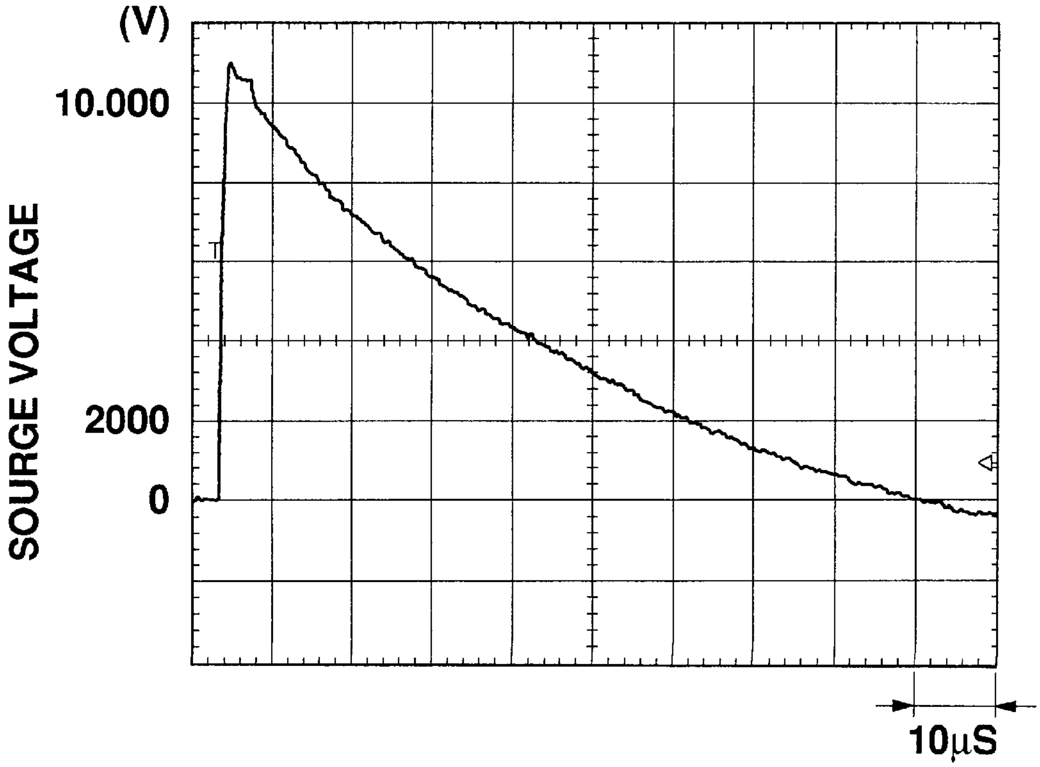
FIG. 15 shows an original surge waveform to be used for the present invention.
Figure 16:
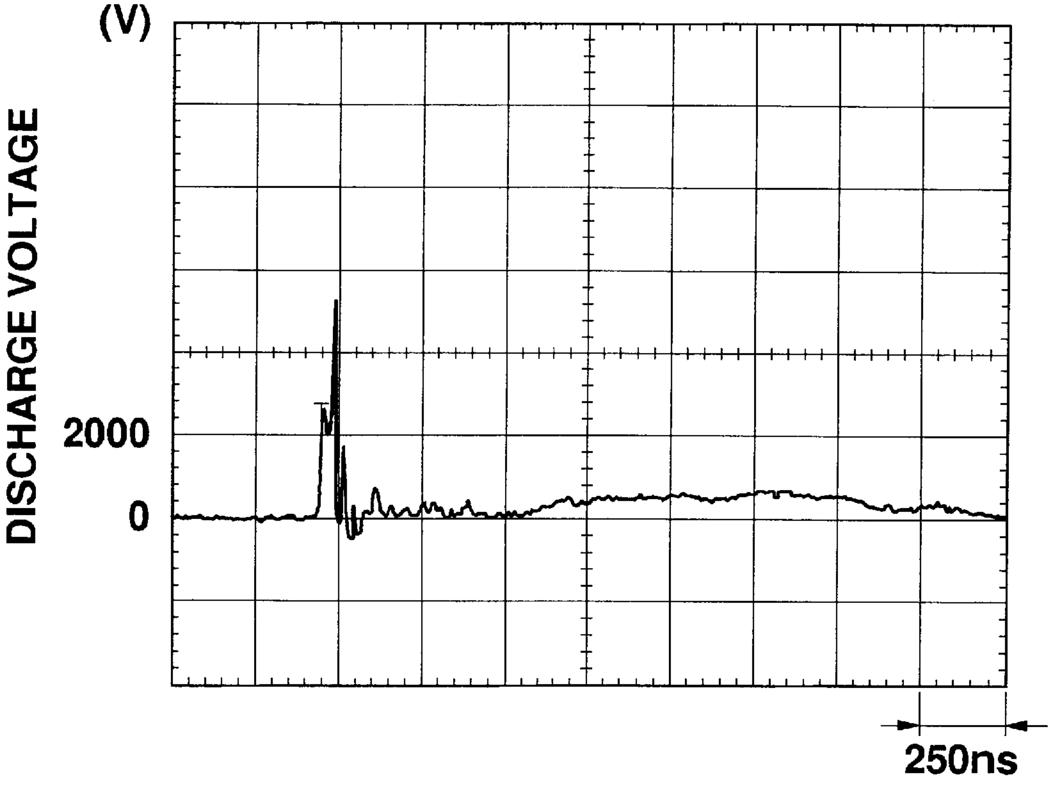
FIG. 16 is a characteristic diagram showing a state of absorbing a surge voltage shown in FIG. 15 according to the present invention.

FIG. 15 shows an original surge wave form which will arise when the preferred embodiment of the present invention shown in FIG. 1 is applied. The surge voltage is 11,120 volts. FIG. 16 shows a discharge voltage at the time of applying the surge voltage shown in FIG. 14 to a 5,000-volt surge absorber according to the present invention. It also shows that a surge absorption operation starts at 5,280 volts, the voltage drops to about 300 volts in approximately 70 nanoseconds, nearly no residual voltage remains, and no dynamic current arises.

As described above, according to the present invention, by sealing clean and dry air, or a mixture mainly comprising clean and dry air, in an air chamber of simple structure provided between a pair of discharge electrodes facing each other in a housing, it is possible to provide a surge absorber which has a long life, is excellent in resistance, and is widely applicable electrical devices.

What is claimed is:

1. A surge absorber comprising:

a housing;

a pair of discharge electrodes arranged face to face in the housing and connected to leads or terminals; and an air chamber provided between said pair of discharge electrodes, wherein clean and dry air or mixture of clean and dry air and an active gas or a mixture of clean and dry air and nitrogen is sealed in said air chamber, wherein the clean and dry air to be sealed in said air chamber has a humidity of five percent or less and a cleanliness of 99.99 percent (0.5 $\mu$mop) or more.

2. The surge absorber according to claim 1, wherein at least one of said pair of discharge electrodes forms a discharge surface in contact with said air chamber.

3. The surge absorber according to claim 1, wherein a convexity to induce discharge is provided on a surface of at least one of said pair of discharge electrodes, said surface being in contact with said air chamber.

4. The surge absorber according to claim 2, wherein the pair of discharge electrodes face each other at a prescribed distance which is less than a length of the housing.

5. The surge absorber according to claim 1, wherein the pair of electrodes are slidably positionable within the housing.

6. The surge absorber according to claim 1, wherein the pair of discharge electrodes are disposed within the housing intermediate first and second ends of the housing.

7. The surge absorber according to claim 1, wherein each of the pair of discharge electrodes has an outer diameter less than an inner diameter of the housing so that each discharge electrode is slidably received within the housing prior to heating the housing.

8. A surge absorber comprising:

a housing;

a pair of discharge electrodes arranged face to face in the housing and connected to leads or terminals; and an air chamber provided between said pair of discharge electrodes, wherein clean and dry air or a mixture of clean and dry air and an active gas or a mixture of clean and dry air and nitrogen is sealed in said air chamber; wherein at least one of said pair of discharge electrodes forms a discharge surface in contact with said air chamber, and wherein the clean and dry air to be sealed in said air chamber has a humidity of five percent or less and a cleanliness of 99.99 percent (0.5 $\mu$mop) or more.

9. A surge absorber comprising:

a housing;

a pair of discharge electrodes arranged face to face in the housing and connected to leads or terminals, and an air chamber provided between said pair of discharge electrodes, wherein clean and dry air or a mixture of clean and dry air and an active gas or a mixture of clean and dry air and nitrogen is sealed in said air chamber, wherein a convexity to induce discharge is provided on a surface of at least one of said pair of discharge electrodes, said surface being in contact with said air chamber and wherein the clean and dry air to be sealed in said air chamber has a humidity of five percent or less and a cleanliness of 99.99 percent (0.5 $\mu$mop) or more.

* * * * *

UNITED STATES PATENT AND TRADEMARK OFFICE

CERTIFICATE OF CORRECTION

PATENT NO. : 6,067,003

DATED : May 23, 2000

INVENTOR(S) : Bing Lin Yang

It is certified that error appears in the above-identified patent and that said Letters Patent is hereby corrected as shown below:

Title page,

Item [30], Foreign Application Priority Data, delete "Mar. 7, 1998" and insert therefor -- July 3, 1998 --

Signed and Sealed this

Twenty-third Day of November, 2004

JON W. DUDAS

*Director of the United States Patent and Trademark Office*